(12) United States Patent
Saito et al.

(10) Patent No.: US 9,020,714 B2
(45) Date of Patent: Apr. 28, 2015

(54) CONTROL DEVICE FOR AUTOMATIC TRANSMISSION

(71) Applicant: Honda Motor Co., Ltd., Tokyo (JP)

(72) Inventors: Hiroshi Saito, Wako (JP); Yutaka Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 13/739,794

(22) Filed: Jan. 11, 2013

(65) Prior Publication Data

US 2013/0184949 A1    Jul. 18, 2013

(30) Foreign Application Priority Data

Jan. 12, 2012 (JP) .................................. 2012-003994

(51) Int. Cl.
| | |
|---|---|
| *B60W 10/11* | (2012.01) |
| *B60W 10/06* | (2006.01) |
| *B60W 30/188* | (2012.01) |
| *F16H 61/02* | (2006.01) |
| *F16H 59/68* | (2006.01) |
| *F16H 61/00* | (2006.01) |

(52) U.S. Cl.
CPC ............... *B60W 10/11* (2013.01); *B60W 10/06* (2013.01); *B60W 30/1882* (2013.01); *B60Y 2300/435* (2013.01); *F16H 2061/0216* (2013.01); *F16H 2061/022* (2013.01); *F16H 2059/6815* (2013.01); *F16H 61/0213* (2013.01); *F16H 2061/0015* (2013.01); *Y02T 10/76* (2013.01)

(58) Field of Classification Search
CPC . B60W 10/06; B60W 10/11; B60W 30/1882; B60Y 2300/435

USPC .......................................................... 701/58
See application file for complete search history.

(56) References Cited

U.S. PATENT DOCUMENTS

| | | |
|---|---|---|
| 2002/0099495 A1 | 7/2002 | Takagi et al. |
| 2008/0176708 A1 | 7/2008 | Tamai et al. |

FOREIGN PATENT DOCUMENTS

CN         102149949 A       8/2011

(Continued)

OTHER PUBLICATIONS

A english translation JP 2006336703 A and JP 2006292114 A.*

(Continued)

*Primary Examiner* — Fadey Jabr
*Assistant Examiner* — Yazan A Soofi
(74) *Attorney, Agent, or Firm* — Squire Patton Boggs (US) LLP

(57) ABSTRACT

For each engine operation state to which a variable cylinder engine can be switched, a fuel consumption amount to be consumed to generate a driving force required to maintain a current traveling state of a vehicle for each of a current gear and a new gear after a possible shift-up is calculated. An automatic shift control of shifting up to the new gear is performed in a condition that a calculated fuel consumption amount of the new gear after the possible shift-up is smaller than a calculated fuel consumption amount of the current gear. In this way, the fuel consumption amount can be optimally reduced and the shift control can be performed without degrading the traveling performance, even in the vehicle equipped with the variable cylinder engine.

5 Claims, 4 Drawing Sheets

(56) References Cited

FOREIGN PATENT DOCUMENTS

| | | | |
|---|---|---|---|
| CN | 102235489 A | | 11/2011 |
| JP | 2959938 B2 | | 7/1999 |
| JP | 2006-292114 A | | 10/2006 |
| JP | 2006292114 A | * | 10/2006 |
| JP | 2006336703 A | * | 12/2006 |
| JP | 4696692 B2 | | 3/2011 |

OTHER PUBLICATIONS

Canadian Office Action application No. 2,801,847 dated Apr. 11, 2014.

Office Action dated Nov. 4, 2014, issued in corresponding CN Application No. 201310010075.3 (with English translation).

* cited by examiner

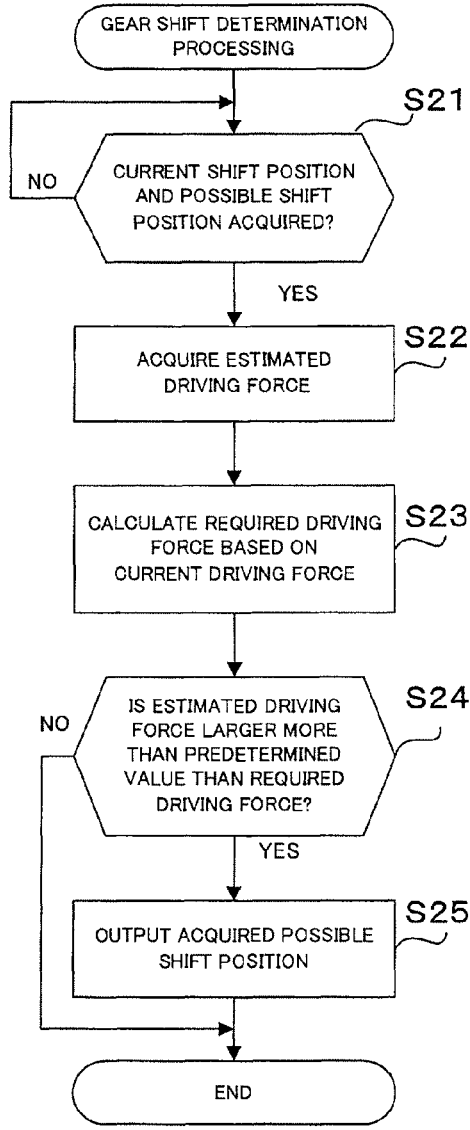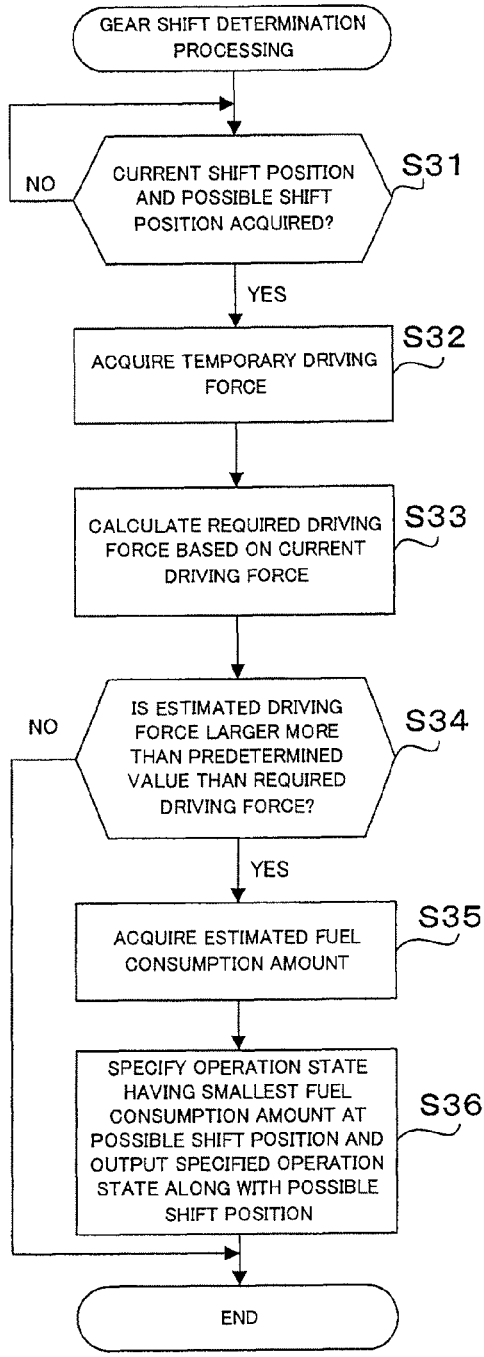

CONTROL DEVICE FOR AUTOMATIC TRANSMISSION

CROSS-REFERENCE TO RELATED APPLICATION

This application is based upon and claims the benefit of priority of the prior Japanese Patent Application No. 2012-003994 filed Jan. 12, 2012, the disclosure of the prior application is hereby incorporated in its entirety by reference.

BACKGROUND

The present invention relates to a control device for an automatic transmission in a vehicle capable of automatically shifting a gear of the automatic transmission to a gear at which the vehicle can travel at the lowest fuel consumption. More particularly, the present invention relates to a technology of performing a shift control for reducing a fuel consumption amount without degrading traveling performance, in an automatic transmission in a vehicle equipped with a variable cylinder engine that can be operated in a cylinder deactivation state.

As a control device for an automatic transmission in a vehicle, there is a control device in which a plurality of types of shift maps that define shift characteristics are prepared, any one of the shift maps is selected based on a determination of whether a vehicle is traveling on an uphill road or a downhill road, a gear (also referred to as a shift position) is determined according to a traveling speed (vehicle speed) of the vehicle and an accelerator pedal opening degree involved in an accelerator operation of a driver, based on the selected shift map, and a transmission is automatically shifted to the determined gear (see Japanese Patent No. 2959938). For example, shift-down control or shift-up control is performed based on the previously prepared shift map for an uphill road while a vehicle travels on an uphill road.

Alternatively, as a control device for the automatic transmission in a vehicle, there is a control device that performs shift control referred to as a low fuel consumption mode and the like, and performs automatic shift from a gear of the transmission to a gear which a vehicle can travel at the lowest fuel consumption within a range in which a vehicle speed is not reduced (see Japanese Patent No. 4696692). By doing so, for example, even after the shift-down is made while a vehicle travels on an uphill road, a shift-up control may be performed quickly so as to reduce the fuel consumption amount of an engine. However, when the shift-up control is made quickly while a vehicle travels on an uphill road, a driving force may be insufficient and a stepped amount of an accelerator pedal by a driver may suddenly increase, and in the worst case, for example, another shift-down may cause an increase in fuel consumption. Therefore, if an allowance driving force is less than a predetermined required allowance driving force when being shifted up to the next gear, the shift-up to the next gear is prohibited, that is, the shift-up shift control is not performed.

As an engine equipped in a vehicle, a variable cylinder engine that can be operated in a cylinder deactivation state has been known. In order to reduce an amount of fuel consumption, the variable cylinder engine is configured to switch an operation state of the engine between a full-cylinder operation in which all the cylinders are operated and a partial cylinder deactivation operation (a cylinder-resting operation) in which some of the cylinders are deactivated (see Japanese Patent Application Laid-Open No. 2006-292114).

As described above, in view of the reduction in the fuel consumption amount of the engine, a gear shift control for a vehicle traveling on an uphill road may be performed as a shift-down control at first, and then, once sufficient driving force has been secured after the shift-down, a shift-up control should be performed as soon as possible. However, in the case of a vehicle equipped with the variable cylinder engine, there is a possibility that any cylinder deactivation operation of the engine cannot be operated due to the performance of the shift-up control. In this case, if the engine is currently operated in a cylinder deactivation operation, the engine is caused to switch from the current cylinder deactivation operation to the full-cylinder operation due to the shift-up of the gear even though the shift-up control is performed in order to reduce the fuel consumption amount of the engine, so that efficiency of reduction of the fuel consumption amount must be decreased.

SUMMARY OF THE INVENTION

In view of the foregoing prior art problems, it is an object of the present invention to provide a control device for an automatic transmission capable of achieving both a reduction in a fuel consumption amount by a shift-up and a reduction in a fuel consumption amount by a cylinder deactivation operation of a variable cylinder engine and capable of reducing a fuel consumption amount and performing shift control without degrading traveling performance, even in an automatic transmission in a vehicle equipped with a variable cylinder engine.

In order to accomplish the above-mentioned object, the present invention provides a control device for an automatic transmission, which comprises: a current shift position detection unit (6) adapted to detect a current shift position indicative of a current gear of the automatic transmission; a possible shift position determination unit (A) adapted to determine a gear after a possible shift-up according to a traveling state of a vehicle; an engine operation state acquisition unit (3) adapted to acquire a current engine operation state of a variable cylinder engine (2) capable of switching between a full-cylinder operation in which all cylinders of the variable cylinder engine are operated and a cylinder deactivation operation in which one or more cylinders of the variable cylinder engine are deactivated; a calculation unit (B) adapted to calculate, for each engine operation state to which the variable cylinder engine can be switched, a fuel consumption amount to be consumed to generate a driving force required to maintain a current traveling state of the vehicle for each of the current gear and the gear after the possible shift-up determined by the possible shift position determination unit; and a gear shift determination unit (C, S11-S13) adapted to allow an automatic shift control to perform a shift-up to the gear after the possible shift-up, based on the calculated fuel consumption amount, when a calculated fuel consumption amount of the gear after the possible shift-up is smaller than a calculated fuel consumption amount of the current gear. Note that numerical values and characters in parentheses above and below represent reference numerals of corresponding constituent elements in later-described embodiments.

According to the present invention, for each engine operation state to which the variable cylinder engine (2) can be switched, the fuel consumption amount to be consumed to generate the driving force required to maintain the current traveling state of the vehicle is calculated for each of the current gear and the gear after the possible shift-up, and the automatic shift control of performing a shift-up to the gear after the possible shift-up is permitted when a calculated fuel consumption amount of the gear after the possible shift-up is smaller than a calculated fuel consumption amount of the current gear. That is, in connection with each of the current gear and the gear after the possible shift-up, the fuel consumption amount for each of the engine operation states including the cylinder deactivation operation is estimated and an actual shift-up control to the gear after the possible shift-up is permitted when the gear after the possible shift-up has the smaller fuel consumption amount. In this way, it is possible to realize both reduction in the fuel consumption amount by the actual shift-up and reduction in the fuel consumption amount by the cylinder deactivation operation of the variable cylinder engine (2), by permitting the automatic shift control of performing the actual shift-up to the gear after the possible shift-up based on the fuel consumption amount taking account of the current engine operation state of the variable cylinder engine (2), such that the fuel consumption amount can be reduced and the shift control can be performed without degrading the traveling performance, even in the vehicle equipped with the variable cylinder engine (2).

According to another aspect of the present invention, there is provided a control device for an automatic transmission, which comprises: a current shift position detection unit (6) adapted to detect a current shift position indicative of a current gear of the automatic transmission; a driving force calculation unit (S23) adapted to calculate a minimum target driving force required to maintain a current traveling state of a vehicle; a possible shift position determination unit (A) adapted to determine a gear after a possible shift-up according to the traveling state of the vehicle; an engine operation state acquisition unit (3) adapted to acquire a current engine operation state of a variable cylinder engine (2) capable of switching between a full-cylinder operation in which all cylinders of the variable cylinder engine are operated and a cylinder deactivation operation in which one or more cylinders of the variable cylinder engine are deactivated; an estimated driving force calculation unit (D) adapted to, when the acquired current engine operation state is the cylinder deactivation operation, calculate an estimation of a driving force after a shift-up required to maintain the current cylinder deactivation operation with the gear after the possible shift-up determined by the possible shift position determination unit; and a gear shift determination unit adapted to allow an automatic shift control to perform a shift-up to the gear after the possible shift-up when the calculated estimation of a driving force after a shift-up is above the target driving force. According to the control device for an automatic transmission mentioned above, it is possible to reduce the fuel consumption amount and perform the shift control without degrading the traveling performance, even in the vehicle equipped with the variable cylinder engine (2) that can perform the cylinder deactivation operation, by permitting the automatic shift control of performing the shift-up to the gear after the shift-up based on the driving force after the shift-up in addition to the current engine operation state of the variable cylinder engine (2).

BRIEF DESCRIPTION OF THE DRAWINGS

Certain preferred embodiments of the present invention will hereinafter be described in detail, by way of example only, with reference to the accompanying drawings, in which:

FIG. 8 is a flow chart showing another example of gear shift determination processing; and FIG. 9 is a flow chart showing still another example of gear shift determination processing.

DETAILED DESCRIPTION

Figure 1:
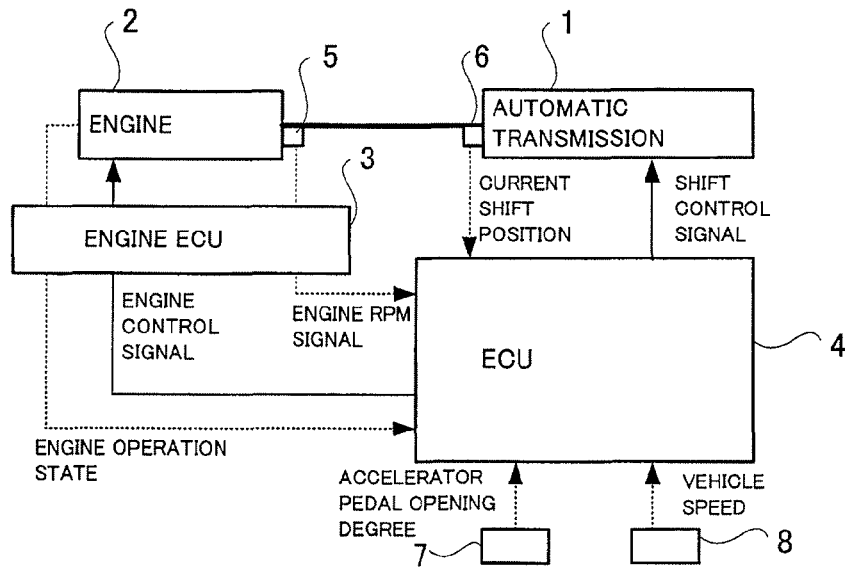
FIG. 1 is a schematic diagram showing an example of a control device for an automatic transmission in a vehicle according to the present invention.

FIG. 1 is a schematic diagram showing an example of a control device for an automatic transmission in a vehicle according to the present invention. The control device for an automatic transmission is a vehicle according to the present invention automatically shifts a plurality of gears (for example, six forward gears) automatic transmission 1 connected to an engine 2 that is at least connected with a power driving source.

The engine 2 is a multi-cylinder internal combustion engine such as a 4-cycle V type 6 cylinder engine, that has, for example, six cylinders equipped with pairs of intake and exhaust valves and has a structure in which three of the six cylinders include variable valve timing mechanisms (not shown) that can be operated in a cylinder deactivation state, and the other three deactivation cylinders include general valve mechanisms (not shown) that are not operated in the cylinder deactivation operation (the cylinder-resting operation). A cylinder deactivation mechanism (not shown) is disposed in the engine 2 and the cylinder deactivation mechanism is driven to open and close the intake and exhaust valves of the three cylinders that can be deactivated among the plurality of cylinders to the deactivation state (a closed state) and the operation state (an opened state). Therefore, the operation state of the engine 2 is switched between cylinder deactivation operation states (herein, either the 4 cylinder operation in which two cylinders are deactivated or the 3 cylinder operation in which three cylinders are deactivated) in which some of the cylinders are deactivated and a full-cylinder operation state (6 cylinder operation) in which all of the cylinders operate.

The control of the engine 2 including the switching of the operation state of the engine 2 is performed by an engine ECU 3 that is provided separately from an ECU 4, and the engine ECU 3 informs the ECU 4 of control information for the engine 2 controlled by the engine ECU 3. FIG. 1 schematically shows the embodiment, but the present invention is not limited thereto. Accordingly, the present invention also includes a type in which a single ECU controls the engine and the automatic transmission. Meanwhile, an output of the engine 2 is transferred to driving wheels (not shown) through the automatic transmission 1.

In the present embodiment, the automatic transmission 1 is controlled by the ECU 4. The ECU 4 includes a CPU, a ROM, a RAM, an input/output interface and the like, and is a micro computer that achieves predetermined functions according to various control programs stored in the ROM while using a temporary memory function of the RAM. The ECU 4 serves as a control device of the automatic transmission 1 according to the present invention and executes a computer program such as estimated fuel consumption amount calculation processing (see FIG. 5), gear shift determination processing (see FIG. 6), etc. as described later, to thereby control/instruct a gear shift in the automatic transmission 1 via a shift control signal.

Further, the ECU 4 is configured to instruct to switch the operation state of the engine 2 between the cylinder deactivation operation states and the full-cylinder operation state through the engine ECU 3 via an engine control signal. When the engine ECU 3 receives the engine control signal from the ECU 4, the ECU 3 instructs the cylinder deactivation mechanism to switch the engine 2 between the cylinder deactivation operations and the full-cylinder operation according to the engine control signal. It should be noted that the engine control signal may include an instruction of the number of cylinders (2 or 3 in this embodiment) that are deactivated when the engine 2 is switched from the full-cylinder operation to any cylinder deactivation operation.

Various signals such as an engine RPM signal from an engine RPM sensor 5 that detects the RPM of the engine 2, a current shift position signal from a shift sensor 6 that detects a current gear position (namely, a current shift position) in the automatic transmission 1, an accelerator pedal opening degree signal supplied from an accelerator pedal sensor 7 which detects a stepped amount or position of the accelerator pedal based on an accelerator pedal operation by a driver, a vehicle speed from a vehicle speed sensor 8 that detects a rotation speed of the driving wheel and the like, are input to the ECU 4. Further, signals other than the signals described herein may be input.

Figure 2:
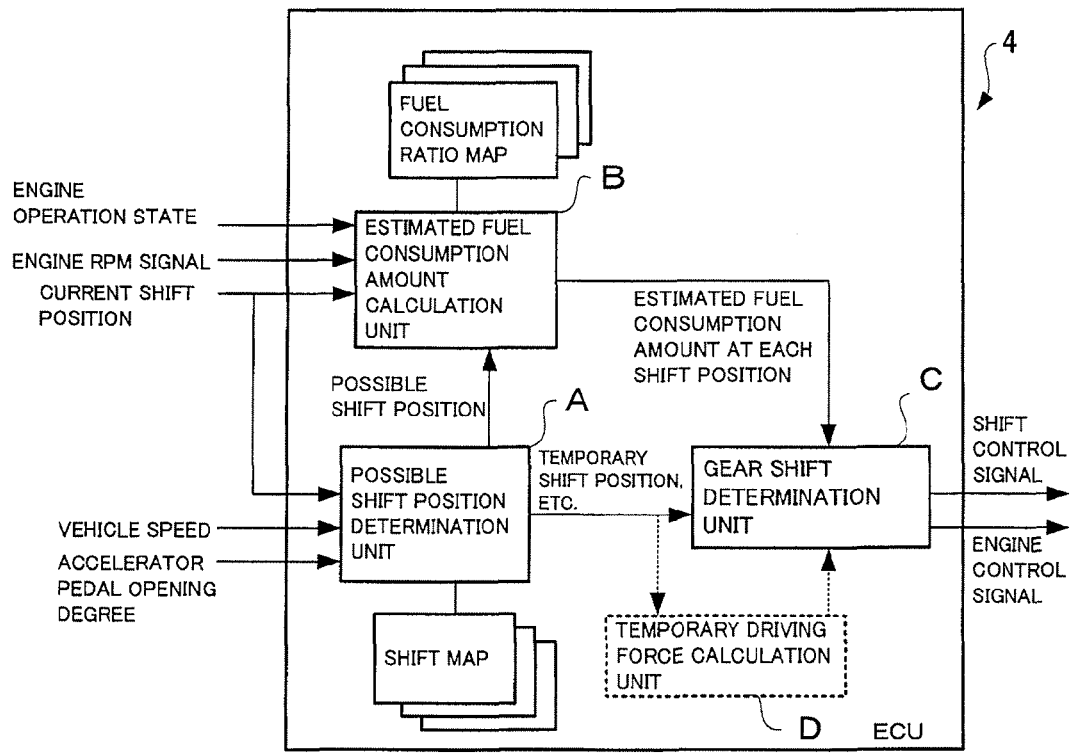
FIG. 2 is a block diagram of the control device for an automatic transmission.

Details of the ECU 4 will be described with reference to FIG. 2. FIG. 2 is a block diagram of the control device (the ECU 4) of the automatic transmission. As shown in FIG. 2, the ECU 4 described in this embodiment includes a possible shift position determination unit A, an estimated fuel consumption amount calculation unit B, and a gear shift determination unit C.

The possible shift position determination unit A determines a next gear (referred to as an possible shift position) suitable to be shifted next to the current shift position based on the vehicle speed and the accelerator pedal opening degree that are acquired according to the actual traveling state of the vehicle, in accordance with a gear shift map (not shown) selected according to a condition of a road on which the vehicle is traveling. That is, as known in the conventional art (see, for example, Japanese Patent No. 2959938), it is determined whether a road on which the vehicle is traveling is a pitched uphill/downhill road by comparing an estimated acceleration based on an engine output with an actually obtained real acceleration, and if it is determined that the road is a pitched uphill/downhill road, any one of a plurality of types of prepared shift maps (for example, such a map as used for a heavy or light uphill road and a heavy or light downhill road) is selected according to the difference between the estimated acceleration and the real acceleration. Further, an possible shift position that is a gear shift destination is determined by addressing the selected shift map with the vehicle speed and the acceleration pedal opening degree.

In the present embodiment, when the vehicle is traveling on an uphill road, the shift control of shifting up to the possible shift position determined therein is not immediately applied as it is in the conventional art, but the automatic transmission 1 performs gear shift-up control to the possible shift position at which an estimated fuel consumption amount of the engine 2 is smaller than others or control of maintaining the gear of the current shift position at which an estimated fuel consumption amount of the engine 2 is smaller than others in accordance with a comparison of the estimated fuel consumption amount corresponding to the possible shift position for a gear shift-up and the estimated fuel consumption amount corresponding to the current shift position. Therefore, the possible shift position determination unit A is configured to output, when the vehicle is traveling on an uphill road and the determined possible shift position is a gear to which a shift-up from the current shift position should be performed, the possible shift position indicative of the gear after a possible shift-up to the estimated fuel consumption amount calculation unit B and the gear shift determination unit C.

Figure 3:
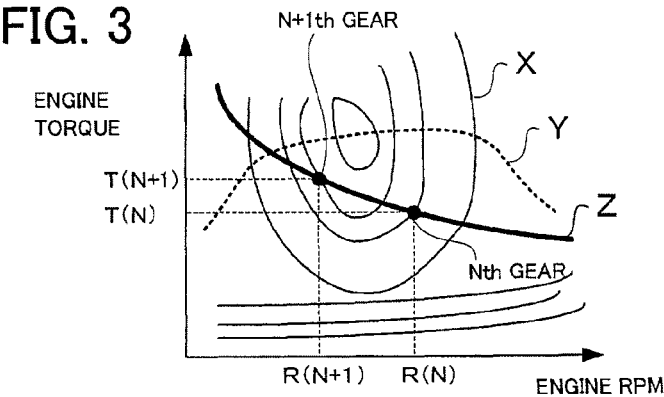
FIG. 3 is a diagram showing an example of a map of fuel consumption ratios.

The estimated fuel consumption amount calculation unit B obtains, based on the fuel consumption ratio map, the estimated fuel consumption amount of the engine 2 at the time of the shift-up to the possible shift position and the estimated fuel consumption amount of the engine 2 if the current shift position is maintained. Herein, FIG. 3 shows an example of the fuel consumption ratio map. In the present embodiment, the fuel consumption ratio maps shown in FIG. 3 are prepared for each of the plurality of different engine operation states (the full-cylinder operation and the cylinder deactivation operations), and the estimated fuel consumption amount calculation unit B calculates, for each different operation state of the engine 2 and based on each fuel consumption ratio map, the estimated fuel consumption amount of the engine 2 at the time of the shift-up to the possible shift position and the estimated fuel consumption amount of the engine 2 if the current shift position is maintained. It should be noted that, for convenience, both of the estimated fuel consumption amounts may be referred to an "estimated fuel consumption amount of each shift position" hereinafter.

Herein, the calculation of the fuel consumption amount of the engine 2 by the estimated fuel consumption amount calculation unit B will be described. In the fuel consumption ratio map shown in FIG. 3, a horizontal axis represents the engine RPM and a vertical axis represents an engine torque. In FIG. 3, solid lines X represent iso-fuel consumption lines of the engine and each one of the iso-fuel consumption lines means that the fuel consumption ratio is equal on the same line respectively. Further, the more inner line of the iso-fuel consumption lines X, the less fuel consumption ratio (namely, good fuel consumption), but the more outer line of the iso-fuel consumption lines X, the more fuel consumption ratio (namely, poor fuel consumption). Further more, in FIG. 3, a line represented by a dotted line Y shows a peak torque of the engine.

First, a horse power minimally required to maintain the current operation state (namely, an output required for the vehicle to stably travel in the current operation state) is determined based on the traveling state of a vehicle and an iso-horse power diagram Z thereof is prepared. The horse power required for stable traveling varies with the traveling conditions (the gradient of the traveling road and the like) and/or the accelerator pedal opening degree, that is, the engine load.

Hereinafter, it is assumed that the current shift position of the transmission 1 is a N-th gear and the engine RPM travels at R(N). Then, in order to maintain the current operation state at the current shift position N, the minimally required torque T(N) is calculated and the iso-horse power diagram Z is prepared based on the required torque T(N) and the engine RPM R(N). Meanwhile, in FIG. 3, symbols in parentheses of the engine RPM R and the engine torque T represent the corresponding gears.

Next, a virtual engine RPM after a gear shift of the transmission 1 is determined based on the current engine RPM R and the transmission ratio of each gear of the transmission 1 and the torque required to maintain the current operation state for each gear is determined based on the virtual engine RPM and the iso-horse power diagram Z. That is, in FIG. 3, the virtual engine RPM after the transmission 1 is shifted up by one gear from the current shift position N to the possible shift position is R(N+1) and the torque required to maintain the current operation state at the (N+1)th gear is T(N+1). Further, the fuel consumption ratio is determined for each gear based on the virtual engine RPM R, the required torque T and the iso-fuel consumption lines X, and the fuel consumption amount of the engine 2 is calculated according to the determined fuel consumption ratio. The fuel consumption amount calculated by the estimated fuel consumption amount calculation unit B is output to the gear shift determination unit C. However, in this case, the fuel consumption amount of the engine 2 only for the gear at which the required torque T is equal to or less than the peak torque Y of the engine 2 may be calculated. Gears at which the required torque T is larger than the peak torque Y of the engine 2 are excluded because there is insufficient driving force, which will cause the vehicle to stall.

Figure 4:
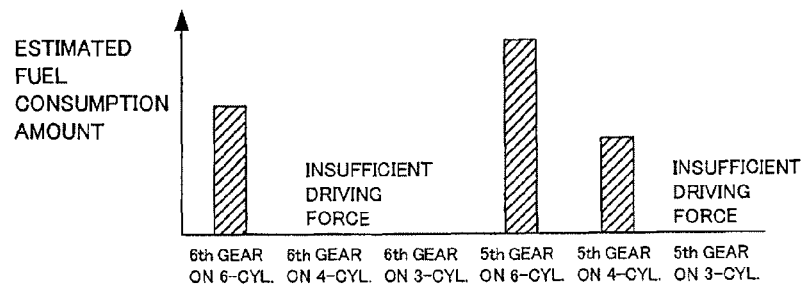
FIG. 4 is a conceptual diagram showing an example of a fuel consumption amount of an engine that is calculated by an estimated fuel consumption amount calculation unit.

As described above, an example of the fuel consumption amount of the engine 2 calculated by the estimated fuel consumption amount calculation unit B is shown in FIG. 4. FIG. 4 shows an example in which the current shift position is 5th gear and the possible shift position is 6th gear. In the present embodiment, the fuel consumption ratio map is prepared for each of the plurality of different engine operation states (the full-cylinder operation and the cylinder deactivation operation). Therefore, the fuel consumption amount of the engine 2 at the time of the shift-up to the possible shift position and the fuel consumption amount of the engine 2 if the current shift position is maintained are calculated for each different engine operation state. That is, as shown in FIG. 4, for each of the engine operation states, namely the full-cylinder operation state (6-cylinder operation) and the cylinder deactivation operation states (4 cylinder operation and 3 cylinder operation), a fuel consumption amount of the engine 2 for each of the possible shift position, e.g., '6th gear', and the current shift position, e.g., '5th gear', is calculated. However, because each of 6th gear on 4 cylinders, 6th gear on 3 cylinders, and 5th gear on 3 cylinders, which are described in FIG. 4 as lack driving force, is a gear at which the torque required to maintain the current operation state is larger than the peak torque of the engine 2, the fuel consumption amount of the engine 2 at these gears is not calculated.

Figure 5:
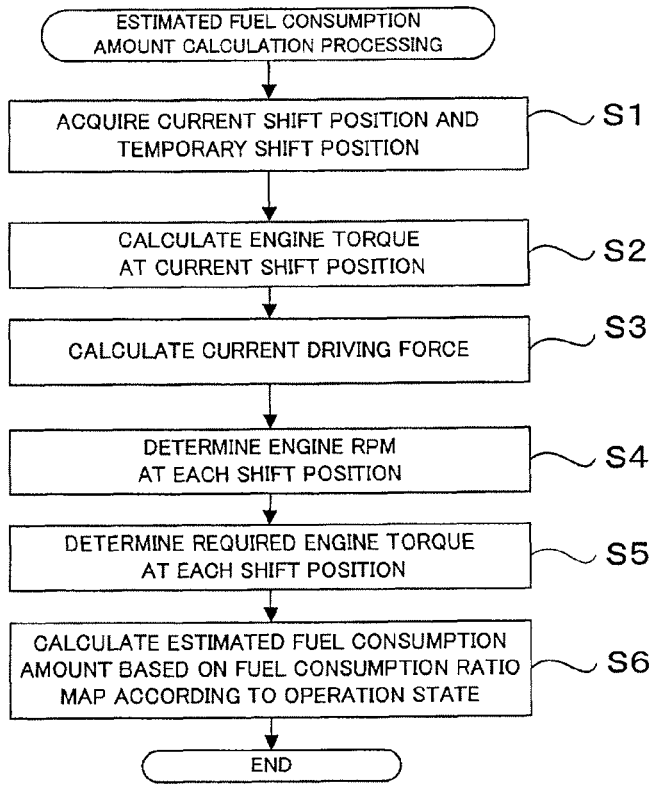
FIG. 5 is a flow chart showing an example of estimated fuel consumption amount calculation processing.

FIG. 5 is a flow chart illustrating an example of the estimated fuel consumption amount calculation processing. In the processing, for each operation state of the engine 2 for which the corresponding fuel consumption ratio map is prepared, the fuel consumption amount of the engine 2 for each of the current shift position and the possible shift position is calculated.

In step S1, the current shift position and the possible shift position are acquired. In step S2, the engine RPM detected by the engine RPM sensor 5 and the engine torque at the current shift position acquired by an air flow introduced into the engine 2 (the torque required to maintain the current operation state) are calculated. In step S3, a tire end driving force of the current gear (a current driving force) is calculated according to Equation 1 based on the calculated engine torque at the current shift position and a gear ratio, a transfer efficiency, a final gear ratio and a tire movement radius at the current shift position determined by a ratio of the engine RPM detected by the engine RPM sensor 5 and the vehicle speed detected by the vehicle speed sensor 8.

Tire end driving force (current driving force) of current gear=engine torque x gear ratio of current gear×final gear ratio×transfer efficiency/tire movement radius  (1), where "x" denotes a multiplication sign and "/" denotes a division sign In step S4, the engine RPM at the current shift position and the engine RPM after being shifted up by one gear to the possible shift position are obtained. Here, the engine RPM at the current shift position is an engine RPM detected by the engine RPM sensor 5. It should be noted that the engine RPM after being shifted up by one gear to the possible shift position (the virtual engine RPM) is calculated depending on Equation 2, based on the gear ratio at the possible shift position, the final gear ratio, the vehicle speed detected by the vehicle speed sensor 8, and the tire movement radius.

Engine RPM after being shifted=vehicle speed×gear ratio at possible shift position x final gear ratio× 1000/(2×π×tire movement radius×60)  (2), where "x" denotes a multiplication sign and "/" denotes a division sign In step S5, the required engine torque at the current shift position and the required engine torque at the possible shift position are determined. As described above, the required engine torques are determined based on the engine RPM (or the virtual engine RPM) and the iso-horse power diagram Z, from the fuel consumption ratio map shown in FIG. 3. In step S6, the fuel consumption amount of the engine 2 at the time of the shift-up to the possible shift position and the fuel consumption amount of the engine 2 if the current shift position is maintained are calculated respectively, based on the fuel consumption ratio determined from the fuel consumption ratio map prepared according to each of the operation states as shown in FIG. 3.

Returning to the description of FIG. 2, a gear shift determination unit C determines any one of the current shift position and the possible shift position acquired from the possible shift position determination unit A as a shift position having good fuel consumption, based on the plurality of fuel consumption amounts of the engine 2 acquired from the estimated fuel consumption amount calculation unit B. Here, the determined shift position is output as the shift control signal for the shift control of the automatic transmission 1. Therefore, the automatic transmission 1 automatically shifts the gear to a new shift position when the determined shift position is different from the current shift position, whereas the automatic transmission 1 maintains the current shift position, that is, does not perform the automatic shift, when the determined shift position is the same as the current shift position. Namely, the gear shift determination unit C is configured to allow an automatic shift control of the automatic transmission 1 to perform a shift-up to the gear after the possible shift-up, based on the calculated fuel consumption amount, when a calculated fuel consumption amount of the gear after the possible shift-up is smaller than a calculated fuel consumption amount of the current gear.

Further, the gear shift determination unit C outputs the engine control signal indicative of a operation state of the engine having good fuel consumption when the shift position having good fuel consumption is determined. Therefore, the engine 2 may be switched between the full-cylinder operation and the cylinder deactivation operation according to the engine control signal. Namely, the gear shift determination unit is also configured to allow the automatic shift control of the automatic transmission 1 to perform the shift-up to the gear after the possible shift-up which has the smallest calculated fuel consumption amount among the calculated fuel consumption amounts and instruct to switch, when an engine operation state corresponding to the smallest calculated fuel consumption amount is different from the acquired current engine operation state, the operation state of the variable cylinder engine to the engine operation state corresponding to the smallest calculated fuel consumption amount from the current engine operation state.

Figure 6:
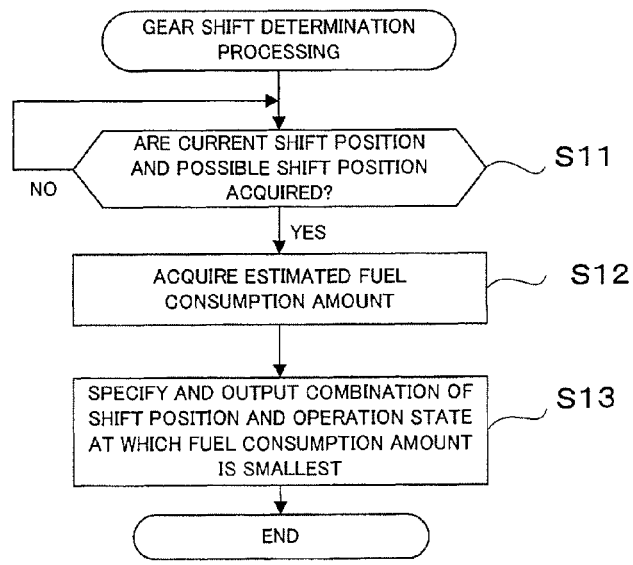
FIG. 6 is a flow chart showing an example of gear shift determination processing.

FIG. 6 is a flow chart illustrating an example of the gear shift determination processing. In step S11, it is determined whether the current shift position and the possible shift position are acquired. When the current shift position and the possible shift position are not acquired (NO in step S11), the gear shift determination processing loops the processing of step S11. That is, the processing does not progress and stand by, until the current shift position and the possible shift position are acquired. Meanwhile, after the current shift position and the possible shift position are acquired (YES in step S11), in step S12, the estimated fuel consumption amounts calculated by the estimated fuel consumption amount calculation unit B are acquired. In step S13, the smallest fuel consumption amount among all estimated fuel consumption amounts corresponding to all operation states at the possible shift position and the current shift position is specified, a combination of a shift position and an operation state corresponding to the smallest fuel consumption is specified, the shift control signal representative of the shift position included in the specified combination is output, and the engine control signal representative of the operation state position included in the specified combination is output. If the output shift control signal represents the possible shift position, then the automatic shift control of the automatic transmission 1 is allowed to perform a shift-up to the gear of the possible shift position (i.e., the gear after the possible shift-up). If the output engine control signal represents an engine operation state different from the current engine operation state, then the variable cylinder engine 2 is instructed to switch from the current engine operation state, e.g., the full-cylinder operation sate, to the engine operation state, e.g., a cylinder deactivation operation state, represented by the engine control signal and corresponding to the smallest fuel consumption amount.

Figure 7:
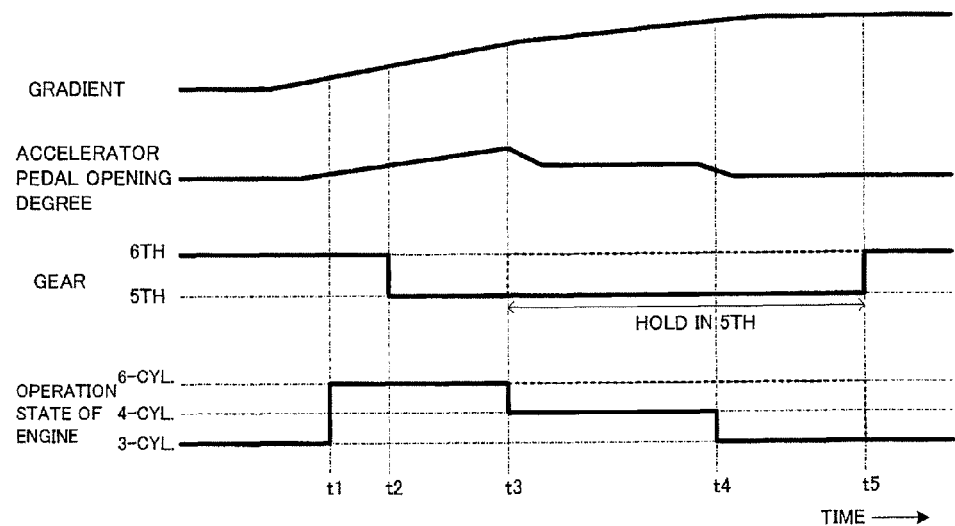
FIG. 7 is a timing chart for describing the gear shift determination.

FIG. 7 is a timing chart for describing the gear shift determination processing. Hereinafter, the shift position determination processing will be described based on the timing chart of FIG. 7. A driver further steps an accelerator pedal if it is determined that a vehicle speed is reduced due to a vehicle reaching an uphill road. In this case, the operation state of the engine is switched from a 3 cylinder operation (the cylinder deactivation operation) to a 6 cylinder operation (the full-cylinder operation) at time t1 or the shift position of the automatic transmission is shifted down from 6th gear to 5th gear at time t2. Further, when the shift position is shifted down from 6th gear to 5th gear and the vehicle is traveling in 5th gear on 6 cylinders, the possible shift position (6th gear) indicating the shift-up control to 6th gear is output in the possible shift position determination processing A at time t3. In the related art, the shift-up control from 5th gear to 6th gear is performed at time t3, and therefore the vehicle is operated in 6th gear on 6 cylinders, lowering the fuel consumption.

Therefore, in the present embodiment, the estimated fuel consumption amount at each shift position is calculated according to the output of the possible shift position and the shift control of the transmission 1 and the operation control of the engine 2 are performed according to the combination of the shift position and the operation state at which the fuel consumption amount is the lowest. For example, in the case of the estimated fuel consumption amount at each shift position calculated by the estimated fuel consumption amount calculation unit B shown in FIG. 4, since the smallest fuel consumption amount is achieved in a combination in which the shift position is 5th gear and the operation state is 4 cylinders, at time t3, the shift control of shifting up from 6th gear to 5th gear is not performed and the control of maintaining the gear at 5th gear is performed, while the operation control of switching the engine 2 from a 6 cylinder operation to a 4 cylinder operation is performed.

At time t4, when the possible shift position (6th gear) indicating the shift-up control from the possible shift position determination processing A to the 6th gear is output, the estimated fuel consumption amount at each shift position is calculated by the estimated fuel consumption amount calculation unit B at that time and the shift control of the transmission 1 and the operation control of the engine 2 are performed according to the combination of the shift position and the operation state at which the fuel consumption amount is the lowest. FIG. 7 shows the case in which a combination of the shift position and the operation state having the smallest fuel consumption amount is a combination of 5th gear on 3 cylinders. That is, at time t4, the control of maintaining the current gear at 5th gear is performed, while the operation control of switching the operation state of the engine 2 from the 4 cylinder operation to the 3 cylinder operation is performed.

Further, at time t5, even when the possible shift position (6th gear) indicating the shift-up control from the possible shift position determination processing A to 6th gear is output, the estimated fuel consumption amount at each shift position is calculated by the estimated fuel consumption amount calculation unit B at that time and the shift control of the transmission 1 and the operation control of the engine 2 may be performed according to the combination of the shift position and the operation state having the smallest fuel consumption amount. Here, it can be seen that the combination of the shift position and the operation state having the smallest fuel consumption amount is the combination of 6th gear and the 3 cylinder operation. That is, at time t5, the shift control of shifting the gear up from 5th gear to 6th gear is performed, while the control of maintaining the operation state of the engine 2 in the 3 cylinder operation is performed.

As described above, in the control device (the ECU 4) of the automatic transmission according to the present invention, the driving force required to maintain the current traveling state of the vehicle in the current gear and the gear after being shifted is generated for each engine operation state of the full-cylinder operation or the cylinder deactivation operation that can be switched by the engine 2, thereby calculating the fuel consumption amount to be consumed. Further, the automatic shift control of shifting up to the new gear is permitted only when the fuel consumption amount of the gear after being shifted is small compared to the fuel consumption amount of the current gear. That is, in connection with the current gear and the new gear after being shifted, respectively, the fuel consumption amount in the case of the engine operation state including the cylinder deactivation operation is estimated and the shift-up control to the new gear is permitted only when the new gear has a smaller fuel consumption amount than that of the current gear. As such, because the automatic shift control of shifting the gear up to the new gear is permitted in consideration of the fuel consumption amount in each gear before and after the possible shifting in addition to the current engine operation state of the variable cylinder engine, both of the reduction in fuel consumption amount by the shift-up and the reduction in the fuel consumption amount by the cylinder deactivation operation of the variable cylinder engine can be implemented. Therefore, even in the vehicle including the variable cylinder engine, the shift control reducing the fuel consumption amount without degrading the traveling performance can be performed.

The embodiments of the present invention have been described above with reference to the drawings by way of example, but the present invention is not limited thereto and can be variously implemented. The foregoing embodiments show that the shift control of the transmission 1 and the operation control of the engine 2 are performed according to the combination of the shift position and the engine operation state for which the fuel consumption amount is the smallest among the estimated fuel consumption amounts corresponding to the current and possible shift positions calculated by the estimated fuel consumption amount calculation unit B, but the present invention is not limited thereto. Hereinafter, several other embodiments will be described.

According to a second embodiment, when an order to perform the shift-up control to the possible shift position is performed while the vehicle is traveling on a flat road or an uphill road in the cylinder deactivation operation, the shift-up control to the possible shift position is not performed if it is determined that the cylinder deactivation operation of the current state cannot be continuously performed, and the shift-up control to the possible shift position is performed only if it is determined that the cylinder deactivation operation of the current state can be continuously performed. In the second embodiment, the ECU 4 excludes the estimated fuel consumption amount calculation unit B in a block diagram shown in FIG. 2 and has a configuration in which estimarted driving force calculation unit D is added between the possible shift position determination unit A and the gear shift determination unit C. Because an operation of the possible shift position determination unit A is the same as the aforementioned, the description thereof will be omitted hereafter.

The estimated driving force calculation unit D calculates an estimation of a driving force (the engine torque), namely an estimated driving force, if the shift-up to the possible shift position according to the possible shift position acquired from the possible shift position determination unit A is performed in the current cylinder deactivation operation state and outputs the calculated estimation of the driving force to the gear shift determination unit C. For example, in the case of a vehicle traveling on an uphill road in 5th gear on 4 cylinders, when a shift-up to 6th gear is instructed, the estimated driving force calculation unit D calculates an estimated driving force (the engine torque) that can be generated in 6th gear on 4 cylinders. It should be noted that a manner of calculating the estimated driving force may be the same as the manner of calculating the current driving force at the time of calculating the fuel consumption amount of the engine 2 by the estimated fuel consumption amount calculation unit B.

Meanwhile, the gear shift determination unit C compares the estimated driving force calculated by the estimated driving force calculation unit D with the required driving force according to the minimum target engine torque required to maintain the current traveling state of the vehicle, and when the estimated driving force is larger more than a predetermined value than the required driving force, outputs the shift control signal for performing the shift-up control to the possible shift position. However, in this embodiment, the gear shift determination unit C does not output the engine control signal regardless of whether the shift control signal is present. By doing so, the operation state of the engine 2 is maintained in the current cylinder deactivation operation state.

FIG. 8 is a flow chart illustrating an example of the gear shift determination processing according to the second embodiment. In step S21, it is determined whether the current shift position and the possible shift position are acquired. When the current shift position and the possible shift position are not acquired (NO in step S21), the shift position determination processing repeats the processing of step S21. When the current shift position and the possible shift position are acquired (YES in step S21), the estimated driving force calculated by the estimated driving force calculation unit D is acquired (step S22). Next, in step S23, the required driving force is calculated based on the current driving force. Next, in step 24, it is determined whether the estimated driving force is larger more than a predetermined value than the required driving force by comparing the estimated driving force with the required driving force. If it is determined that the estimated driving force is not larger more than the predetermined value than the required driving force (NO in step S24), the processing goes to end. In this case, the gear shift determination unit C does not output the shift control signal (or the engine control signal), such that the shift position is maintained in the current shift position (the operation state of the engine 2 is in the cylinder deactivation operation state in the current state). Note that when it is determined that the estimated driving force is larger more than the predetermined value than the required driving force (YES in step S24), the shift control signal representing the acquired possible shift position is output (step S25).

In a third embodiment, the shift-up control to the possible shift position is performed only when it is determined that the cylinder deactivation operation of the current state can be continued, like the second embodiment. However, unlike the aforementioned second embodiment, in the third embodiment, the cylinder deactivation operation control for changing from the current cylinder deactivation operation state to another cylinder deactivation operation state which has the smallest fuel consumption is performed along with the shift-up control. In the case of the third embodiment, the ECU 4 has a configuration in which the estimated driving force calculation unit D is added between the possible shift position determination unit A and the gear shift determination unit C, without excluding the estimated fuel consumption amount calculation unit B in a block diagram shown in FIG. 2. Further, both of the output from the possible shift position determination unit A and the output from the estimated driving force calculation unit D are acquired by the gear shift determination unit C. Each operation of the possible shift position determination unit A, the estimated fuel consumption amount calculation unit B, and the estimated driving force calculation unit D has already been described, and therefore the description thereof will be omitted.

In the third embodiment, the gear shift determination unit C compares the estimated driving force calculated by the estimated driving force calculation unit D with the required driving force according to the minimum target engine torque required to maintain the current traveling state of the vehicle, and when the estimated driving force is larger more than the predetermined value than the required driving force, outputs the shift control signal for performing the shift-up control to the possible shift position. However, in this embodiment, the gear shift determination unit C specifies an operation state having the smallest fuel consumption amount among the calculated estimated fuel consumption amounts acquired from the estimated fuel consumption amount calculation unit B and outputs the specified operation state as the engine control signal at the same time of outputting the shift control signal. By doing so, the operation state of the engine 2 is maintained in a cylinder deactivation operation state, but may be different from the current state in terms of the number of cylinders that are deactivated.

FIG. 9 is a flow chart illustrating an example of the gear shift determination processing according to the third embodiment. The processing from S31 to S34 is the same as the processing from S21 to S24 of FIG. 8, and therefore the description thereof will be omitted. If step S34 determines that the estimated driving force is larger more than a predetermined value than the required driving force (YES in step S34), the fuel consumption amount for each of the current and possible shift positions is acquired from the estimated fuel consumption amount calculation unit B (step S35). Next, in step S36, the shift control signal indicative of the possible shift position is output, an operation state having the smallest fuel consumption amount among the acquired estimated fuel consumption amounts corresponding to the possible shift position is specified, and the engine control signal indicative of the specified operation state is output Like the third embodiment, in a fourth embodiment, the cylinder deactivation operation control for changing from the current cylinder deactivation operation state to another cylinder deactivation operation state which has the smallest fuel consumption amount is performed along with the shift-up control. However, unlike the third embodiment, in the fourth embodiment, determination whether the shift-up control to the possible shift position should be performed or not is made based on an estimated driving force that may be generated in the full-cylinder operation at the possible shift position. In the fourth embodiment, the ECU 4 may be configured as in the third embodiment. However, the estimated driving force calculated by the estimated driving force calculation unit D is a driving force after the shift-up to the possible shift position in the full-cylinder operation state. Further, in the fourth embodiment, the gear shift determination processing may be the same as in the third embodiment (see FIG. 9). However, the 'estimated driving force' in step S32 or S34 should be assumed as the estimated driving force that may be generated in the full-cylinder operation at the possible shift position as described above.

This application is based on, and claims priority to, Japanese patent application No. 2012-003994 filed on 12 Jan. 2012. The disclosure of the priority application, in its entirety, including the drawings, claims, and the specification thereof, are incorporated herein by reference.

What is claimed is:

1. A control device for an automatic transmission comprising:
   a detector configured to detect a current shift position indicative of a current gear of the automatic transmission; and
   a processor configured to:
      determine a gear after a possible shift-up according to a traveling state of a vehicle;
      acquire information indicative of a current engine operation state of a variable cylinder engine capable of switching between a plurality of engine operation states including a full-cylinder operation in which all cylinders of the variable cylinder engine are operated and a cylinder deactivation operation in which one or more of the cylinders of the variable cylinder engine are deactivated;
      calculate, for each of the plurality of engine operation states, a fuel consumption amount to be consumed to generate a driving force required to maintain a current traveling state of the vehicle for the current gear and a fuel consumption amount to be consumed to generate the driving force required to maintain the current traveling state of the vehicle for the gear after the possible shift-up; and
      allow an automatic shift control to perform a shift-up to the gear after the possible shift-up, based on the calculated fuel consumption amounts for the plurality of engine operation states, when a calculated fuel consumption amount of the gear after the possible shift-up is smaller than a calculated fuel consumption amount of the current gear.

2. The control device of an automatic transmission according to claim 1, wherein the processor is configured to allow the automatic shift control to perform the shift-up to the gear after the possible shift-up which has the smallest calculated fuel consumption amount among the calculated fuel consumption amounts and instruct to switch, when an engine operation state corresponding to the smallest calculated fuel consumption amount is different from the current engine operation state, the operation state of the variable cylinder engine to the engine operation state corresponding to the smallest calculated fuel consumption amount from the current engine operation state.

3. The control device of an automatic transmission according to claim 1, the processor is further configured to:
   calculate a minimum target driving force required to maintain the current traveling state of the vehicle; and,
   when the current engine operation state is the cylinder deactivation operation, calculate an estimation of a driving force after a shift-up required to maintain the current cylinder deactivation operation with the gear after the possible shift-up,
   wherein the processor unit is configured to permit the automatic shift control of performing the shift-up to the gear after the possible shift-up when not only the calculated fuel consumption amount of the determined gear after the possible shift-up is smaller than the calculated fuel consumption amount of the current but also the calculated estimation of a driving force after a shift-up is above the target driving force.

4. The control device of an automatic transmission according to claim 1, the processor is further configured to:
   calculate a minimum target driving force required to maintain the current traveling state of the vehicle; and
   calculate an estimation of a driving force after a shift-up to be generated after a gear has been shifted to the gear after the possible shift-up,
   wherein the processor is configured to permit the automatic shift control of performing the shift-up to the gear after the possible shift-up when not only the calculated fuel consumption amount of the gear after the possible shift-up is smaller than the calculated fuel consumption amount of the current gear but also the calculated estimation of a driving force after a shift up is above the target driving force.

5. A control device for an automatic transmission, comprising:
   a detector configured to detect a current shift position indicative of a current gear of the automatic transmission; and
   a processor configured to:
      calculate a minimum target driving force required to maintain a current traveling state of a vehicle;
      determine a gear after a possible shift-up according to the traveling state of the vehicle;
      acquire information indicative of a current engine operation state of a variable cylinder engine capable of switching between a plurality of engine operation states including a full-cylinder operation in which all cylinders of the variable cylinder engine are operated and a cylinder deactivation operation in which one or more of the cylinders of the variable cylinder engine are deactivated;

when the acquired current engine operation state is the cylinder deactivation operation, calculate an estimation of a driving force after a shift-up required to maintain the current cylinder deactivation operation with the gear after the possible shift up; and allow an automatic shift control to perform a shift-up to the gear after the possible shift-up when the calculated estimation of a driving force after a shift-up is above the target driving force.

\* \* \* \* \*